June 4, 1963
E. A. SCHILLING
3,092,767
GENERATOR AND REGULATOR
Filed July 14, 1960
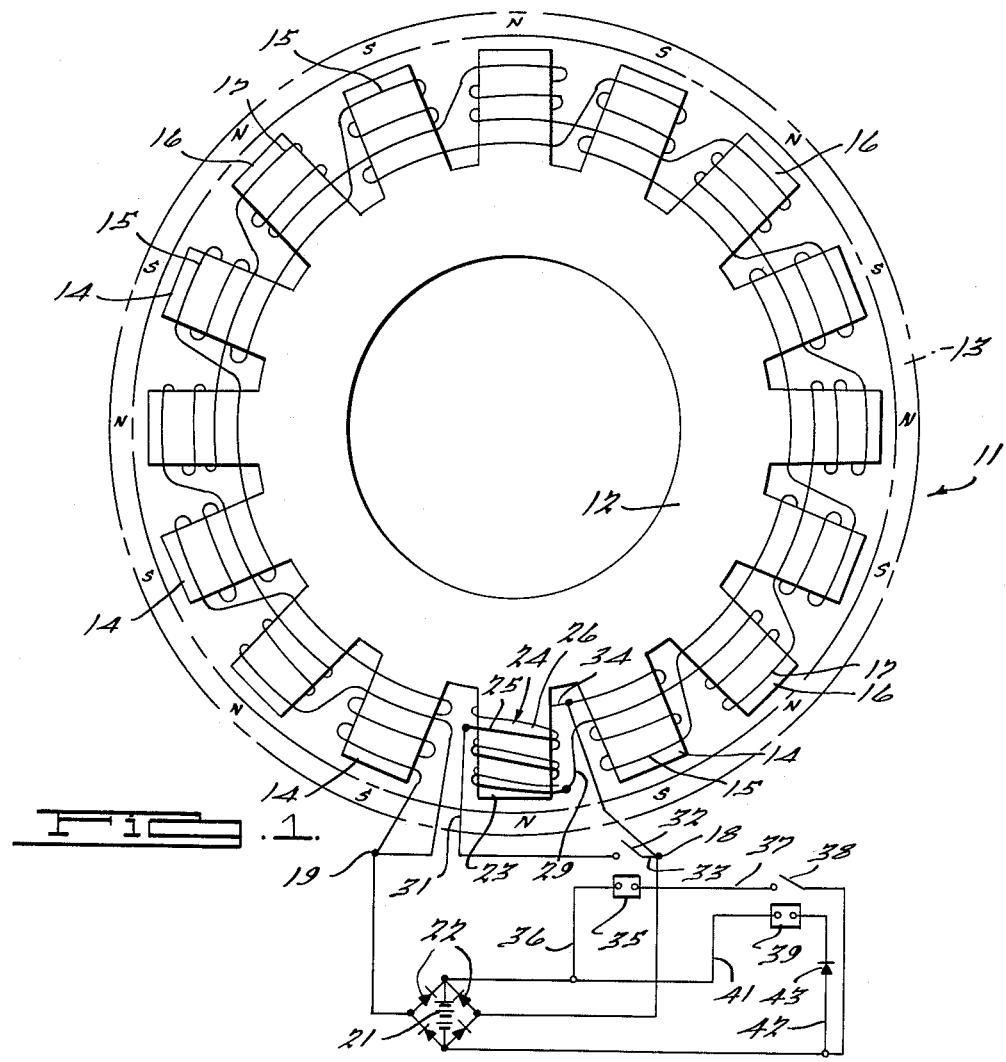
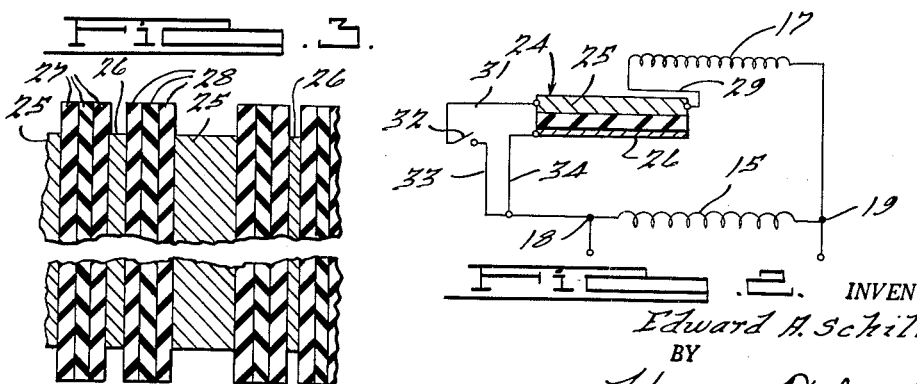
INVENTOR.
Edward A. Schilling
BY
Harness, Dickey & Pierce
ATTORNEYS

United States Patent Office 3,092,767
Patented June 4, 1963

3,092,767
GENERATOR AND REGULATOR
Edward A. Schilling, Drayton Plains, Mich., assignor to Syncro Corporation, Oxford, Mich., a corporation of Michigan
Filed July 14, 1960, Ser. No. 42,936
13 Claims. (Cl. 322—90)

This invention relates to permanent magnet-type generators, and more particularly to means for regulating the output of such generators.

It is an object of the invention to provide a novel and improved regulating arrangement for use in conjunction with a permanent magnet generator of the type described and claimed in copending application Serial No. 830,432, filed July 29, 1959, by Thomas F. Carmichael and assigned to the assignee of the present application, and now Patent No. 3,009,092.

In one embodiment of this type of generator the resonant network, including voltage-generating coils and capacitance means in series, are connected in parallel with the load circuit across the load, the resonant circuit or so-called "tank" coils being in opposed relation to the load coils. Conventionally, the capacitor is mounted on one of the core poles, and with an even number of core poles being used, this capacitor replaces one of the tank coils.

In regulating the output of such a generator by providing a shunt circuit for the capacitor, which places the tank and load coils in direct opposition in response to a signal, it has been found that the generator output may not decrease sufficiently to give satisfactory regulation. Because of this, it has been found necessary in some instances to place an additional coil, equivalent to the wire size used in the tank coils, on the outside of the capacitor and connect this extra coil in series with the remaining tank coils. This of course results in a complex, cumbersome and costly arrangement.

It is an object of the present invention to provide a novel and improved regulating system for use in conjunction with the aforementioned type of generator, which will eliminate the necessity for such additional windings and will achieve satisfactory regulation at a much lower cost and in a more compact manner.

It is another object to provide an improved regulator arrangement of this type which utilizes one of the windings of the capacitor itself as an inductance device, so that the capacitor assembly serves the dual function of providing capacitance in the resonant network and of aiding the other tank coils to reduce output when the capacitance is taken out of the circuit.

Other objects, features, and advantages of the present invention will become apparent from the subsequent description, taken in conjunction with the accompanying drawings.

In the drawings:

FIGURE 1 is a schematic electrical circuit diagram showing a typical installation using the novel regulator arrangement for charging a battery;

FIGURE 2 is a simplified electrical circuit diagram of the load and tank coils, the inductance-capacitance device, and the regulating switch; and FIGURE 3 is a fragmentary cross-sectional view of a portion of a combined inductance-capacitance coil made in accordance with the invention.

In general terms, the invention comprises a permanent magnet generator having a plurality of voltage-generating coils, referred to as load coils, adapted to be connected across a load, and a second group of coils, referred to as tank coils, on alternate poles of the core and likewise connected across the load. An inductance-capacitance device is mounted on one of the poles in place of a tank coil and comprises a pair of metallic strips wound in overlapping spiral relation and separated by strips of dielectric material. One of the metallic strips is relatively thick and is of copper or other highly electrically conductive material, while the other strip is a thin strip of aluminum or metal having similar properties. One end of the copper strip is connected to an end of the tank coil series, and the second end to one contact of a regulator switch, the other contact of the switch being connected to an output terminal. The aluminum strip has one end (adjacent the second end of the copper strip) connected to the same output terminal and the other end unconnected.

With the switch open, the copper and aluminum strips will coact in a capacitative manner to impart properties to the circuit enhancing the output of the generator as described in the aforementioned application. When the switch is closed in response to a signal, such as the accumulation of a predetermined charge in a battery, the capacitance will be eliminated and the tank and load coils connected in electrical opposition to substantially reduce or eliminate the generator output, the copper strip carrying the tank coil current and coacting with the other tank coil winding to achieve this effect.

Referring more particularly to the drawings, the generator is generally indicated at 11 and comprises a core structure 12 and a relatively rotatable field structure 13, these structures being shown schematically in such fashion that the field structure surrounds the core structure. The core is shown as having sixteen poles, one set of poles 14 having load coils 15 thereon, whereas an alternate set of poles 16 have tank coils 17 thereon. The tank coils form part of an inductive-capacitative resonant network of the type described in the aforementioned copending application. Load coils 15 are shown as being connected in series across a pair of output terminals 18 and 19. A load comprising a battery 21 to be charged is connected across the output terminals through rectifiers 22.

Tank coils 17 are mounted on seven poles 16 between poles 14, and the eighth pole 23 carries an inductive-capacitative unit generally indicated at 24. This unit comprises a pair of metallic strips or foils 25 and 26, strip 25 being of copper or other highly electrically conductive metal, whereas strip 26 is fabricated of aluminum or a metal having similar electrical and mechanical properties.

Unit 24 may be manufactured by any of various known methods, including essentially the steps of winding the two strips in spiral fashion separated by two sets of dielectric separators 27 and 28, as shown in FIGURE 3. These separators may be of paper or other suitable dielectric material, the thickness and configuration of these separators being chosen in accordance with the desired electrical properties of the unit.

The cross-sectional area of copper strip 25 is such as to enable it to carry substantially the current flowing through tank coils 17. Aluminum strip 26 on the other hand is preferably made as thin as possible in order to conserve space and obtain the greatest number of turns of the foils in the winding that is possible in the space permitted, if desired to achieve the desired capacitance and inductance. FIGURE 3 shows the thickness difference between the copper and aluminum strips in exaggerated form.

The strips and separators are so wound as to be capable of being mounted on pole 23. One end of copper strip 25 (indicated as a heavy line in FIGURE 1) is connected by a lead 29 to one end of the tank windings 17, which in turn are connected in series. The orientation of strip 25 on its pole is such that it will be in aiding relation with respect to the tank coils. The other end of the copper strip is connected by a lead 31 to one contact of a switch 32, the other contact of this switch being connected by a lead 33 to output terminal 18.

Aluminum strip 26 has one free end, and the other end connected by a lead 34 to output terminal 18. The end of strip 26 connected to output terminal 18 is adjacent the end of strip 25 connected to switch 32.

Switch 32 is a regulating switch controlled by a relay 35. The illustrated embodiment of the regulating circuit bears some resemblance to that shown in Jacob Patent No. 2,900,591, dated August 18, 1959. On side of relay 35 is connected by a lead 36 to one side of battery 21, the other side of relay 35 being connected by a lead 37 to the other side of the battery. A sensing switch 38 is interposed in lead 37, this switch being normally open and being controlled by a sensing relay 39. The sensing relay is likewise connected across the battery by leads 41 and 42, lead 42 having a sensing device such as a zener diode 43 therein, this sensing device being responsive to the accumulation of a predetermined voltage in battery 21 to permit current flow in one direction through relay 39 but not permitting current flow in the other direction.

In operation, relative rotation of members 12 and 13 will cause the creation of electrical potentials in coils 15 and 17, and with switch 32 normally opened, unit 24 will act as a capacitor in series with tank coil 17. The coaction of voltage generating coils 15 with the resonant network comprising tank coils 17 and unit 24 will result in a substantial output at the terminals 18 and 19, charging battery 21.

When the battery reaches a predetermined voltage, device 43 will be triggered, energizing sensing relay 39 which will close switch 38. This will cause energization of regulating relay 35, closing switch 32. Although in appropriate circumstances switch 32 may be opened and closed very rapidly in a vibrating manner, the action of the circuit while switch 32 is closed may be considered as demonstrating the functions and advantages of the invention.

When switch 32 is closed, tank coils 17 and copper strip 25 will be connected in series across terminals 18 and 19. As described previously, the winding orientation of tank coils 17 and copper strip 25 is such that these coils and strip will be in opposition to the voltage created by load coils 15. This fact, plus the location of the tank coils or strip 25 on all poles between poles 14, will result in an extremely sharp reduction in the output at terminals 18 and 19. Upon opening of switch 32, the strips 25 and 26 will again cooperate to produce the capacitative effect in the resonant network which includes tank coils 17, thus again enhancing the output of load coils 15 in accordance with the principles set forth in the aforementioned copending application.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A regulated power supply system comprising a generator including first voltage generating winding means, a resonant network including another voltage generating winding means and a capacitor having first and second elements, and voltage-responsive means for shifting said system between a first condition in which said other voltage generating winding means and capacitance are in series across at least a portion of said first winding means, and a second condition in which said other voltage generating winding means and one of said capacitor elements are in series across at least a portion of said first winding means.

2. In a regulated power supply system, a generator including first voltage generating winding means, a resonant network including second voltage generating winding means and a capacitor mounted in said generator, one element of said capacitor comprising a voltage generating winding, and voltage responsive means for shifting said system between a first condition in which said second winding means and capacitor are in series across at least a portion of said first winding means, and a second condition in which said second winding means and said capacitor element are in series across at least a portion of said first winding means.

3. In a regulated power supply system, a generator having a first voltage generating winding means on a core pole, a second voltage generating winding means on another core pole, a capacitor on a third core pole, said capacitor including at least one element of highly electrically conductive material, and voltage responsive means for shifting said system between a first condition in which said second winding means and capacitor are in series across said first winding means, and a second condition in which said second winding means and said one capacitor element are in series across said first winding means.

4. The combination according to claim 3, said highly conductive capacitor element comprising a copper foil strip, the other capacitor element comprising a thinner aluminum foil strip, and dielectric separating means between said strips.

5. In a regulated power supply system for charging a battery, a generator having a first voltage generating winding means connected across said battery, a second voltage generating winding means and a capacitor mounted in said generator, and means responsive to the accumulation of a predetermined charge on said battery for shifting said system from a first condition in which said second winding means and capacitor are in series across said first winding means, to a second condition in which said second winding means and one element of said capacitor are in series across said first winding means, said one element of the capacitor being so disposed within said generator and of such material as to cause reduction of voltage generation when the system is in said second condition.

6. In combination, a generator having a core and a relatively rotatable field structure, first and second voltage generating winding means mounted on said core, a capacitor mounted on said core and having at least one element adapted to generate voltage in response to said relative rotation, and voltage responsive means movable between a first position in which said second winding means and capacitor are connected in series with each other and across said first winding means, and a second position in which said second winding means and said one capacitor element are connected in series with each other and in parallel opposing relation with said first winding means.

7. In combination, a generator having a field structure and a core, an even number of poles on said core, a first set of voltage generating coils mounted on alternate core poles, a second set of voltage generating coils mounted on all the poles but one between said first-mentioned poles, a capacitor mounted on the remaining pole, at least one element of said capacitor comprising a voltage generating winding, and voltage-responsive means movable between a first position connecting said second set of coils and said capacitor in series with each other and in parallel across at least a portion of said first set of coils, and a second position in which said second set of coils and said one capacitor element are connected in series with each other and in parallel opposing relation with at least a portion of said first set of coils.

8. In combination, a generator having a permanent magnet field structure and a core having a plurality of poles, a first set of voltage generating coils on alternate poles connected in series, a second set of voltage generating coils mounted on poles between said first set of poles, a capacitor having two overlapping foil strips wound on another pole of said core between two poles having said first set of coils, one of said strips being of copper and having a cross-sectional area sufficient to carry the current in said second set of coils, the other strip being of aluminum and being thinner than said copper strip, first and second connections from adjacent ends of said copper and aluminum strips, respectively, to the same end of said first set of coils, a regulating switch in said first connection, a connection between the other end of said copper strip and one end of said second set of coils, a connection between the remaining ends of said first and second sets of coils, and voltage responsive means for closing and opening said switch.

9. The combination according to claim 8, said voltage responsive means including a regulating relay, a battery and rectifying means connected across said first set of coils, and a sensing relay responsive to the voltage accumulated in said battery for energizing and de-energizing said regulating relay.

10. In combination, a generator having relatively rotatable core and field structures, an even number of poles on said core structure, load coils in series mounted on alternate core poles, a battery and rectifying means connected across said load coils, tank coils in series mounted on all but one of the poles between said load coil poles, one end of said tank coils being connected to one end of said load coils, a capacitor having copper and aluminum foil strips wound in overlapping spiral relation with dielectric separating means on said remaining pole, first and second connections from adjacent ends of said copper and aluminum strips respectively to the other end of said load coils, a third connection between the other end of said copper strip and the other end of said tank coils, said tank coils and copper strip being wound so as to be in electrically opposed relation with said load coils, the current carrying capacity of said copper strip being substantially the same as that of said tank coils, a normally open switch in said first connection, and means responsive to the accumulation of a predetermined voltage in said battery for closing said switch.

11. In combination, an inductive coil, an inductance-capacitance unit comprising a first highly conductive foil strip and a second less conductive foil strip wound in overlapping spiral relation with dielectric separating means between said strips, means electrically connecting said coil and unit, and means for shifting said connecting means between a first condition in which said unit acts as a capacitance in series with said coil, and a second condition in which said first strip acts as an inductance in series with said coil.

12. The combination according to claim 11, said first strip comprising a relatively thick copper strip, said second strip comprising a relatively thin aluminum strip.

13. In combination, an inductive coil, an inductance-capacitance unit comprising a first relatively highly conductive foil strip and a second relatively less conductive strip wound in overlapping spiral relation with dielectric separate means between said strips, a connection between one end of said highly conductive strip and said coil, the adjacent end of the less conductive strip being unconnected, a second connection between the remaining adjacent ends of said strips, and a switch in said connection, said switch being movable between an open position in which the strips of said unit coact to produce a capacitative effect in series with said coil, and a closed position in which said highly conductive strip produces an inductive effect in series with said coil.

References Cited in the file of this patent
UNITED STATES PATENTS

| | | |
|---|---|---|
| 917,181 | Steinmetz | Apr. 6, 1909 |
| 1,412,933 | Gordon | Apr. 18, 1922 |
| 2,000,441 | Given | May 7, 1935 |
| 2,521,513 | Gray | Sept. 5, 1950 |